J. W. NEAL.
WAVE MOTOR.
APPLICATION FILED JULY 14, 1911.
1,026,450.
Patented May 14, 1912.
2 SHEETS—SHEET 2.
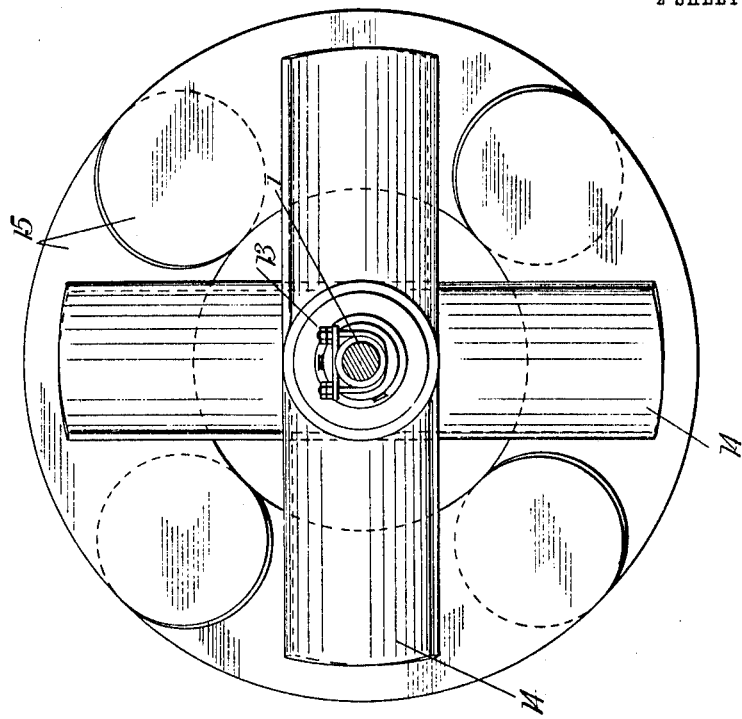
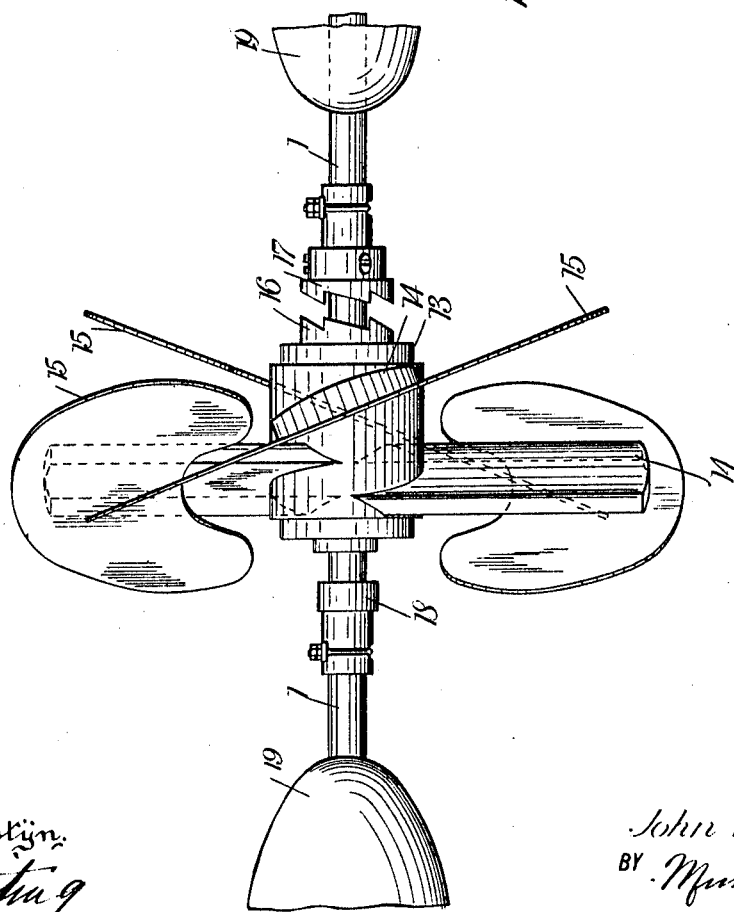
WITNESSES
INVENTOR
John W. Neal
BY Munn & Co.
ATTORNEYS

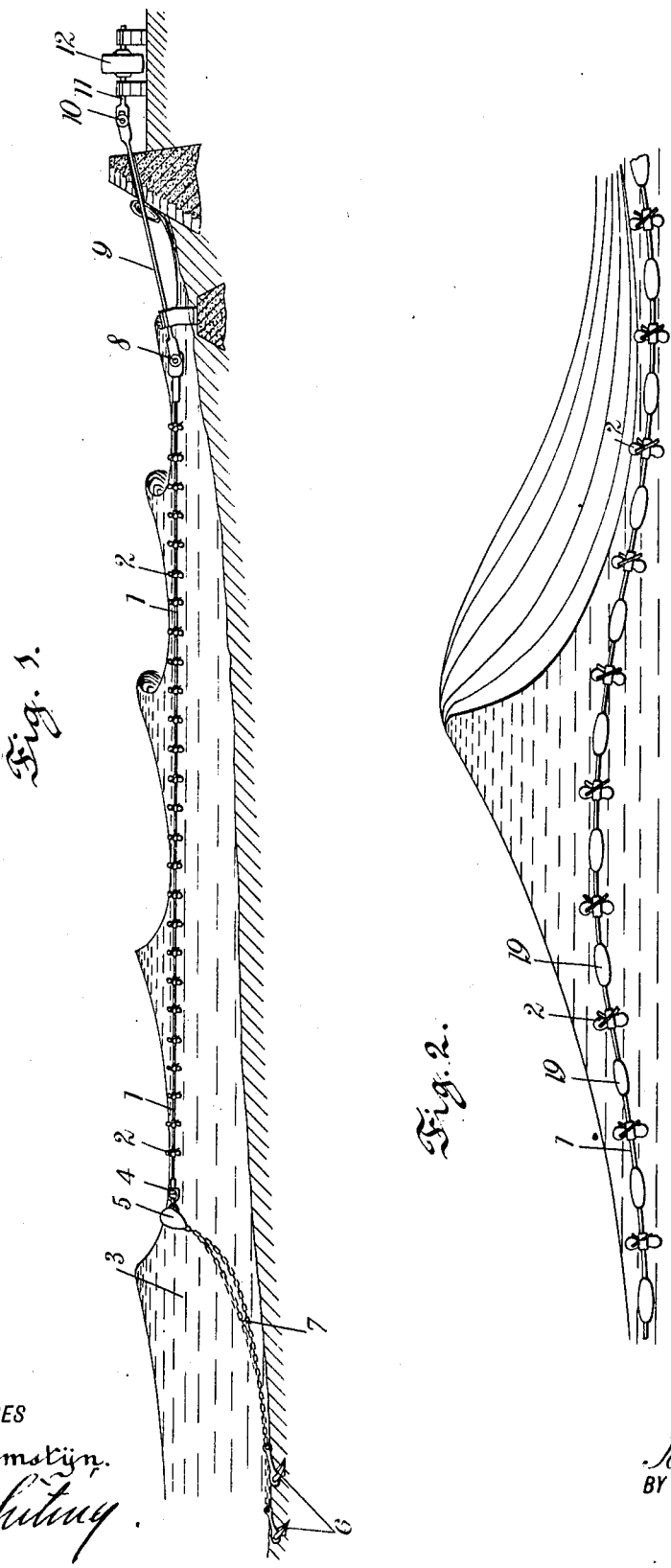

UNITED STATES PATENT OFFICE.

JOHN WALKER NEAL, OF KEALIA, TERRITORY OF HAWAII.

WAVE-MOTOR.

1,026,450.   Specification of Letters Patent.   Patented May 14, 1912.

Application filed July 14, 1911. Serial No. 638,467.

*To all whom it may concern:*

Be it known that I, JOHN W. NEAL, a citizen of the United States, and a resident of Kealia, in the county of Kauai and Territory of Hawaii, have invented a new and Improved Wave-Motor, of which the following is a full, clear, and exact description.

This invention relates to a new and improved motor for utilizing the power generated by the waves of a body of water and transforming it into available energy.

An object of this invention is to provide a flexible transmission member with a plurality of propellers or turbines connected thereto in such a manner as to absorb a portion of the energy of the waves of a body of water in which said device is placed.

A further object of this invention is to provide a wave motor embodying a power transmission member with a plurality of propellers or turbines connected thereto in such a manner as to automatically engage in driving relation therewith, when active, and disengage from driving relation therewith, when inactive.

A still further object of this invention is to provide a wave motor which will be simple in construction, inexpensive to manufacture, strong, durable, easily installed, and simple and efficient in its operation.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a vertical section through a section of the beach, showing one of my wave motors in operation; Fig. 2 is an enlarged view showing a fragment of the wave motor and its action in the crest of a wave; Fig. 3 is an enlarged fragmentary view in elevation, of one of the propellers or turbines; and Fig. 4 is a view taken at right-angles to Fig. 3.

Referring more particularly to the separate parts of this invention as embodied in the form shown in the drawings, 1 indicates a power transmission member, which may be of any suitable structure, such as a flexible shaft, which may be either a cable or of any other approved form such, for instance, as shown in United States Patents Nos. 732,415 and 787,904, dated June 30, 1903 and April 25, 1905, respectively. On this shaft are mounted at suitable intervals propellers or turbines 2 of any character adapted to absorb the energy due to the waves of a body of water, indicated at 3.

One end of the power transmission member 1 may be secured in any suitable manner, as by having a swivel connection 4 with a float or buoy 5, which is anchored, so as to hold the transmission member 1 comparatively taut, by means of anchors 6 secured to the float 5 by any suitable type of connection, such as chains 7. The opposite end of the power transmission member 1 may be provided with a universal connection 8, which joins it with a shaft 9. The latter may be provided with a universal connection 10, which joins it with a shaft 11, where the power generated may be used to rotate a generator 12 or any other suitable type of motive means.

The propellers 2 may be of any suitable character, but preferably consist of a hub 13, rotatably mounted on the shaft or transmission member 1, and a plurality of radiating spokes 14, preferably of wood so that they will aid in buoying up the wave motor in the water, and sheet-metal blades 15 secured with a predetermined pitch on the spokes 14. It will be noted that these blades may overlap each other circumferentially, so as to get the maximum effect of the water thereon. As has been stated, the propeller 13 may be rotatably mounted on the shaft or transmission member 1, and is adapted to be automatically connected in driving relation therewith by the action of the water itself. For this purpose, the hub 13 may be provided with a one-way clutch 16, which is adapted to engage the corresponding clutch 17 secured to the shaft or power transmission member 1.

A stop collar 18 may be provided for limiting the motion of the propeller away from the clutch 17. It will be noted that when the water comes against the blades of the propeller in the correct direction, tending to rotate the same, the propeller will be simultaneously forced with its clutch 16 into engagement with the clutch 17, so that the propeller will drive the shaft 1.

The spokes 14, with the tension of the power transmission member may be sufficient to buoy up the wave motor as a whole, or it may be desired to provide intermediate the propellers 2, suitable floats 19, secured to the power transmission member.

The operation of the device will be readily understood when taken in connection with the above description. The waves, in coming toward the shore, are formed with crests and troughs. When the crest hits the propellers, it will bring each of them successively in driving relation with the power transmission member or shaft 1, by means of the clutches 16 and 17, and by its further motion, will react on the inclined blades of the propellers, causing them to rotate and thus translate their rotation into rotation of the shaft 1. Inasmuch as the wave motor extends a considerable distance, there will be a considerable number of crests acting on the wave motor at the same time, so that the power will be multiplied to the extent of the number of propellers for the crests of the waves. The propellers which happen to be in the troughs of the waves will be automatically disconnected by the back action of the water, so that even if they should be rotated in the opposite direction, they will not tend to retard the motion of the shaft, nor will they act as a drag on the shaft if no power is being generated through them, as the shaft will rotate relative to them.

It will thus be seen that there is provided a simple and inexpensive means for generating considerable power, which can be readily installed and taken care of.

While I have shown one embodiment of my invention, I do not wish to be limited to the specific details thereof, but desire to be protected in various changes, alterations and modifications which may come within the scope of the appended claims.

Having thus described my invention, I claim as new and desire to secure by Letters Patent:—

1. In a wave motor, the combination with a flexible shaft adapted to extend longitudinally into a body of water, of floating means for buoying said transmission member up in said water, means for anchoring one end of said transmission member, and a plurality of propellers mounted on said transmission member at suitable spaced intervals and adapted to transmit the rotary motion engendered therein by the waves of said water to said transmission member.

2. In a wave motor, the combination with a power transmission member adapted to extend longitudinally into a body of water, of floating means for buoying said transmission member up in said water, means for anchoring one end of said transmission member, a plurality of propellers mounted on said transmission member at suitable spaced intervals and adapted to transmit the rotary motion engendered therein by said water to said transmission member, said propellers being loosely mounted on said transmission member, and clutching means for connecting said propellers in driving relation with said transmission member.

3. In a wave motor, the combination with a power transmission member adapted to extend longitudinally into a body of water, of floating means for buoying said transmission member up in said water, means for anchoring one end of said transmission member at suitable spaced intervals and adapted to transmit the rotary motion engendered therein by said water to said transmission member, said propellers being loosely mounted on said transmission member, clutching means for connecting said propellers in driving relation with said transmission member, and floats on said transmission member interposed between said propellers for buoying up said transmission member in said water.

4. In a wave motor, the combination with a flexible shaft adapted to be extended into a body of water, of a plurality of propellers connected to said shaft at suitable spaced intervals and adapted to impart to said shaft the motion engendered in it by the waves of said water.

5. In a wave motor, the combination with a shaft adapted to be extended into a body of water, of a plurality of propellers rotatably mounted on said shaft at suitable spaced intervals, a clutch on each of said propellers, and corresponding clutches on said shaft, said clutches being adapted to interlock with each other during the motion of said propellers in one direction, and to cam off from each other during the motion of said propellers in the other direction.

6. In a wave motor, the combination with a shaft, adapted to be extended into a body of water, of a plurality of propellers rotatably mounted on said shaft at suitable spaced intervals, a clutch on each of said propellers, and corresponding clutches on said shaft, said clutches being adapted to interlock with each other during the motion of said propellers in one direction and to cam off from each other during the motion of said propellers in the other direction, each of said propellers comprising a hub, wooden spokes radiating from said hub, and sheet-metal blades secured to said spokes.

7. In a wave motor, the combination with a shaft adapted to be extended into a body of water, of a plurality of propellers rotatably mounted on said shaft at suitable spaced intervals, a clutch on each of said propellers, corresponding clutches on said shaft, said clutches being adapted to interlock with each other during the motion of said propellers in one direction, and to cam off from each other during the motion of said propellers in the other direction, a plurality of floats mounted on said shaft, adapted to buoy up the same in said water, a float secured swivelly to the end of said shaft, and means for anchoring said last-mentioned float.

In testimony whereof I have signed my name to this specification in the presence of two subscribing witnesses.

JOHN WALKER NEAL.

Witnesses:
M. R. TEVES,
JOAQUIM DE SAUZA.